United States Patent [19]

Strähle

[11] Patent Number: 5,612,817
[45] Date of Patent: Mar. 18, 1997

[54] ZOOM SYSTEM FOR AT LEAST TWO STEREOSCOPIC VIEWING BEAM PATHS

[75] Inventor: Fritz Strähle, Heubach, Germany

[73] Assignee: Carl-Zeiss-Stiftung, Heidenheim, Germany

[21] Appl. No.: 576,454

[22] Filed: Dec. 21, 1995

[30] Foreign Application Priority Data

Dec. 23, 1994 [DE] Germany .......................... 44 46 210.7

[51] Int. Cl.⁶ .................................................. G02B 21/22
[52] U.S. Cl. ............................................ 359/377; 359/363
[58] Field of Search ...................... 359/377, 376, 359/363, 744, 684, 685

[56] References Cited

U.S. PATENT DOCUMENTS

| | | | |
|---|---|---|---|
| 4,175,826 | 11/1979 | Blaha et al. ............................. | 359/377 |
| 4,364,629 | 12/1982 | Lang et al. ............................... | 359/377 |
| 5,227,914 | 7/1993 | Hanzawa et al. ........................ | 359/377 |
| 5,331,457 | 7/1994 | Hanzawa et al. ........................ | 359/377 |
| 5,394,267 | 2/1995 | Hanzawa ................................. | 359/377 |

FOREIGN PATENT DOCUMENTS 4336715  4/1994  Germany .

*Primary Examiner*—Jon W. Henry
*Attorney, Agent, or Firm*—Walter Ottesen

[57] ABSTRACT

The invention is directed to a zoom system for at least two stereoscopic viewing beam paths and includes a multi-element pancratic magnification system as well as an afocal inverting system arranged downstream of the pancratic magnification system at the viewing/documentation end. The inverting system images the stereoscopic pupillary plane or the apparatus pupils of the viewing/documentation unit approximately in the center of the pancratic magnification system. The zoom system is especially suitable for a stereomicroscope.

13 Claims, 3 Drawing Sheets

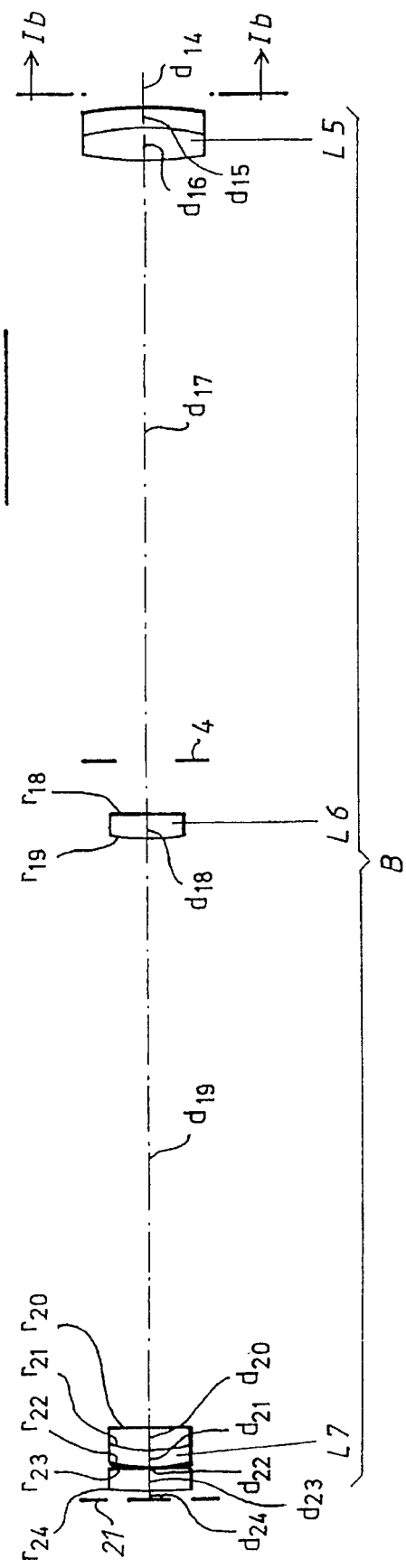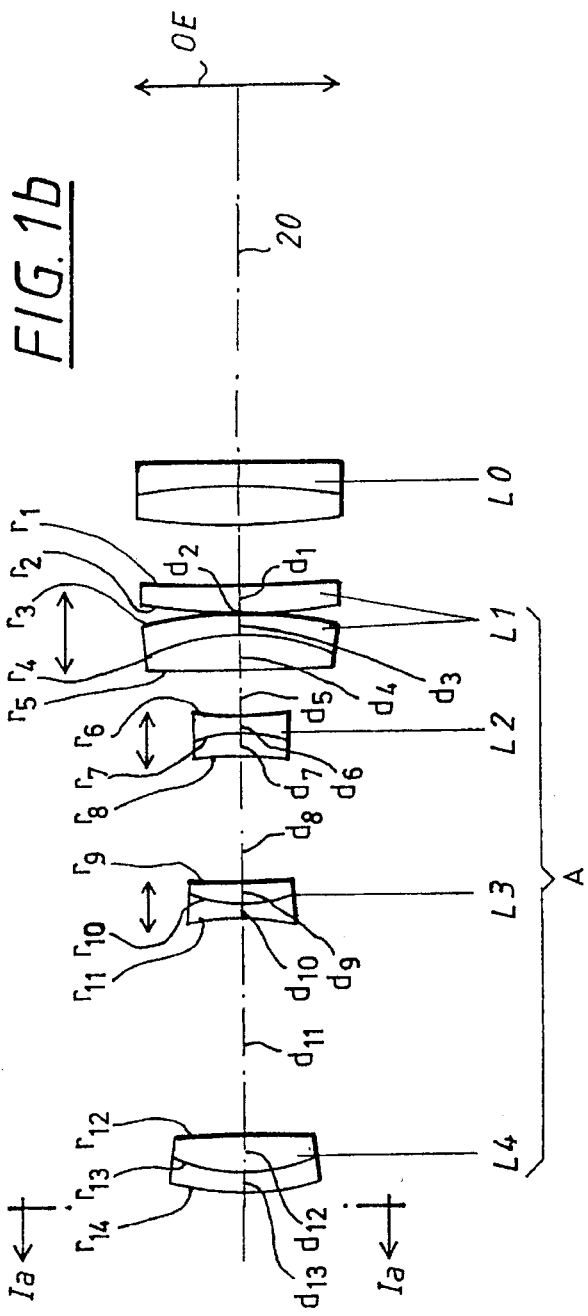
FIG.1a
FIG.1b

ZOOM SYSTEM FOR AT LEAST TWO STEREOSCOPIC VIEWING BEAM PATHS

FIELD OF THE INVENTION

The invention relates to a zoom system for at least two stereoscopic viewing beam paths. This system is preferably utilized in a stereomicroscope.

BACKGROUND OF THE INVENTION

Known stereomicroscopes which are configured pursuant to the telescope principle include, as a rule, a common main objective for the two stereoscopic viewing beam paths. The main objective used can therefore be configured with a fixed focal length as well as with a variable focal length. A pancratic magnification system is arranged downstream of the main objective in most cases. In this context, a separate pancratic magnification system is provided for each of the two stereoscopic viewing beam paths.

Such separate pancratic magnification systems for the individual stereoscopic viewing beam paths require relatively high complexity. Thus, the individual magnification systems in the two stereoscopic viewing beam paths must, for example, be adjusted precisely with respect to each other with reference to image position and parallelism of the two optical axes. Furthermore, highly precise mechanical devices are required for the two magnification systems which guarantee the same movement of the optical elements when varying the magnification. An increased complexity in manufacture with respect to the optical elements needed in duplicate also results.

For solving the problem referred to above, U.S. Pat. Nos. 5,227,914 and 5,331,457 as well as German patent publication 4,336,715 each disclose that a pancratic magnification system can be mounted rearward of the main objective of a stereomicroscope of this kind. The magnification system has a common optical axis with the main objective. The clear diameter of the optical components of the pancratic magnification system is then dimensioned in each case so large that the two stereoscopic viewing beam paths pass through the pancratic magnification system in common. Basically, a solution of the kind referred to above permits the abovementioned increased complexity to be reduced and the adjustment to be simplified. For a high zoom factor with a large magnification range, the optical system disclosed in the above-mentioned United States patents and German patent publication has however the disadvantage that it must be built relatively large because of the large clear diameter which then results. This situation is alleviated in accordance with the teaching of German patent publication 4,336,715 in that a beam deflection is provided within the pancratic magnification system.

Such a beam deflection also complicates the assembly of the stereomicroscope in an unwanted manner because a simple control of the movable components of the pancratic magnification system is no longer possible because of the folded beam path within the pancranic magnification system.

SUMMARY OF THE INVENTION

In view of the above, it is an object of the invention to provide a zoom system for at least two stereoscopic viewing beam paths which permits a simple control of the movable elements of the zoom system even for a larger zoom factor. Furthermore, a compact assembly of the zoom system is provided wherein various viewing and/or documentation possibilities are assured for the operator.

The zoom system of the invention is within a stereoscopic assembly and defines a pregiven stereoscopic pupillary plane. The zoom system is for at least two stereoscopic beam paths of a viewing and/or documentation apparatus arranged downstream of the zoom system viewed in a direction starting from an object plane. The apparatus defines apparatus pupils lying in the stereoscopic pupillary plane, and the zoom system includes: a multi-element pancratic magnification system defining an optical axis; and, an afocal inverting system arranged on the axis between the viewing and/or documentation apparatus and the pancratic magnification system for imaging the stereoscopic pupillary plane into the pancratic magnification system.

According to the invention, the zoom system includes a known pancratic magnification system as well as a downstream afocal inverting system. The afocal inverting system essentially satisfies two functions. On the one hand, the pupil diameters of the stereomicroscope viewing or documentation beam paths are changed by the selection of a suitable imaging scale of the inverting system and are preferably imaged reduced in the pancratic magnification system. At the same time, the magnitude of the particular stereo basis can be adjusted in this manner. The stereo basis is the distance between the two viewing pupils.

On the other hand, the apparatus pupils (that is, the entry pupils of the stereoscopic viewing and/or documentation system) can be optimally imaged in the pancratic magnification system with the aid of the afocal inverting system; that is, an imaging of the stereoscopic pupillary plane into the pancratic magnification system can be effected. The imaging of the stereoscopic pupillary plane takes place via the afocal inverting system preferably approximately in the center of the particular pancratic magnification system.

In this way, the afocal inverting system also guarantees an optimal correction of the image error of the pancratic magnification system.

A further significant advantage of the configuration of the invention is that the stereoscopic beam paths or beams run intertwined with each other in the pancratic magnification system and exhibit only a relatively slight radial expansion. As a consequence thereof, the pancratic magnification system is configured with a relatively small clear diameter. A significant shortening of the structural length of the pancratic magnification system results from the foregoing.

A further advantage of the compact beam guidance within the pancratic magnification system is that, despite the relatively small diameter of the zoom system, practically no vignetting occurs and thereby no drop in intensity between image center and image edge results.

Furthermore, the zoom system of the invention ensures that the image intensity remains constant over the entire zoom range. This is especially important for precision applications such as when utilizing one of the above-mentioned stereomicroscopes as a surgical microscope. This is based on the consideration that the size of the exit pupils of the zoom system of the invention remains constant in the stereoscopic pupillary plane even for varying magnification.

A compact assembly of the complete zoom system of the invention is ensured via a folding of the beam path of only the afocal inverting system with the aid of one or more suitable deflecting elements such as prisms or mirrors. The variation of magnification occurs in an embodiment of this kind in the linearly assembled portion, that is, in the pancratic magnification system; whereas, a folding beam path in the pancratic magnification system is necessary in the optical system disclosed in German patent publication 4,336,715.

An internal focussing within a specific range of intercept distances can be realized with the zoom system of the invention via an element of the pancratic magnification system which is movable along the optical axis.

The zoom system of the invention is furthermore afocal and therefore makes possible the use of main objectives of different focal length in combination with the zoom system of the invention within a stereomicroscope. In this way, an optional adaptation to various working distances and magnifications, et cetera is possible.

Furthermore, various known afocal pancratic magnification systems having at least three optical components can be used as the pancratic magnification system. What is decisive here is that in each case the optical configuration of the afocal inverting system is such that the apparatus pupils of the stereoscopic viewing or documentation system are optimally imaged with respect to position and magnitude, preferably approximately in the center of the pancratic magnification system.

At the viewing/documentation end, the zoom system of the invention permits the use of a conventional binocular tube to permit a direct viewing by an observer as well as the use of one or more electrooptical detector units which assume the recordation of the particular image in a manner known per se.

BRIEF DESCRIPTION OF THE DRAWINGS

The invention will now be described with reference to the drawings wherein:

FIGS. 1a and 1b show a side elevation schematic section view of an embodiment of the zoom system of the invention in combination with a fixed focal length main objective of a stereomicroscope;

Figure 2:
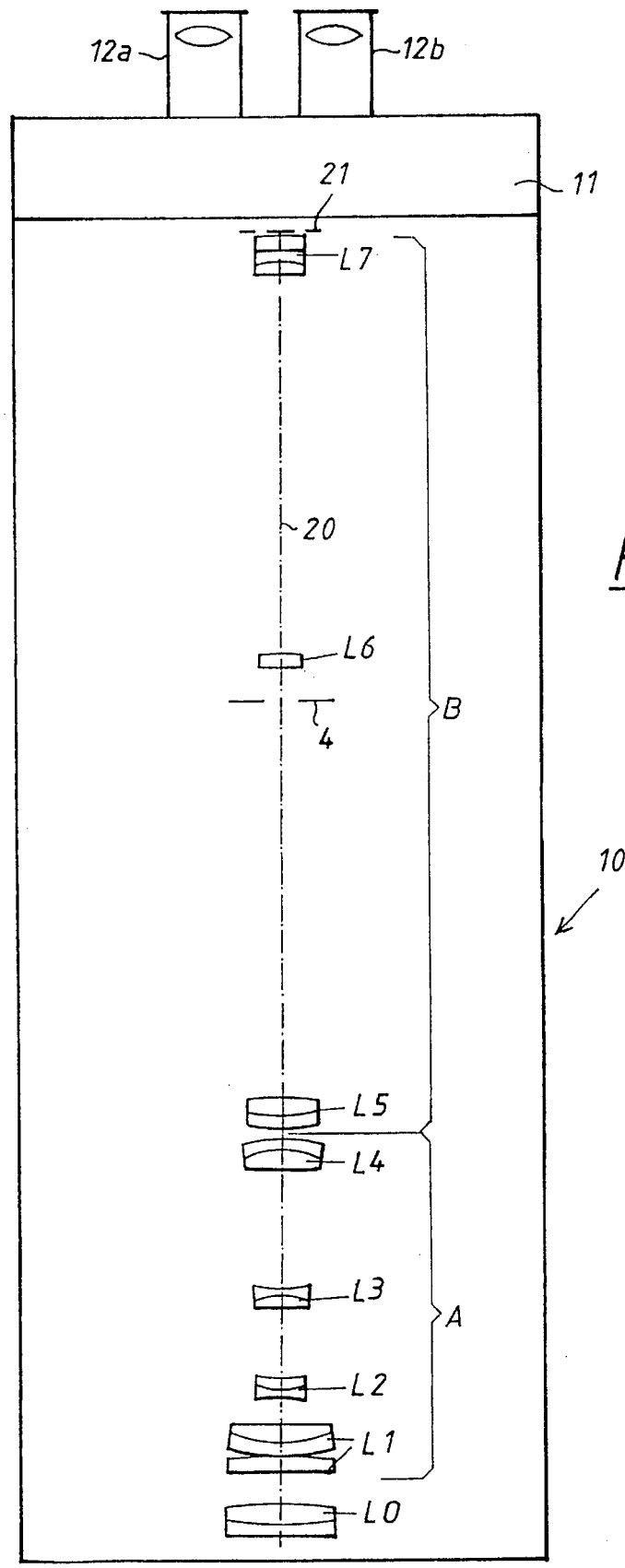
FIG. 2 is a schematic representation of a stereomicroscope having a conventional binocular tube and which includes the zoom system of the invention; and, FIG. 3 is a schematic of a stereomicroscope equipped with the zoom system of the invention as well as two electrooptical detector units arranged in the same housing wherein a folded beam path is provided for the afocal inverting system.

DESCRIPTION OF THE PREFERRED
EMBODIMENTS OF THE INVENTION

FIGS. 1a and 1b show an embodiment of the zoom system of the invention in combination with a fixed focal length main objective L0 of a stereomicroscope. A desired object plane OE is viewed with the stereomicroscope. In FIGS. 1a and 1b, the following are also indicated: the individual optical components as well as the lens radii $r_i$, lens thicknesses and lens distances $d_i$ as they are specified in the set of data provided in Table 1.

In the embodiment shown, only two stereoscopic component beam paths are provided. However, it is possible at any time to utilize the zoom system of the invention also in combination with more than two stereoscopic component beam paths, for example, when further component beam paths for a second observer or for documentation are provided.

In the following, the configuration of the zoom system according to the invention is explained starting from the main objective L0 along the optical axis 20 of the entire system. As a main objective L0, main objectives having different focal lengths can be considered as well as various objectives. The zoom system of the invention follows downstream of the main objective L0. Several stereoscopic viewing beam paths in common pass through the main objective L0. The zoom system comprises, on the one hand, a known multi-element pancratic magnification system A which is mounted directly downstream of the main objective L0 and is shown in FIG. 1b.

In the embodiment of FIG. 1b, the pancratic magnification system A includes four optical components (L1, L2, L3, L4). Starting from the main objective L0, a first convex optical component L1 is provided which is followed by two optical components (L2, L3) having a diverging optical effect. A further component L4 having a collecting optical function is provided as the fourth optical component of the pancratic magnification system A. All optical components (L1, L2, L3, L4) of the pancratic magnification system A are configured in the embodiment shown as composite elements with one of the composite elements including an individual lens.

The pancratic magnification system A of the zoom system of the invention includes two inner diverging optical elements (L2, L3). To obtain a desired variation of the magnification, the two components (L2, L3) are displaced in a defined mutual dependency which is indicated by the two arrows shown.

A variation of magnification in the interval of $\Gamma=(0.5-2.0)$ is possible with the optical data of the illustrated embodiment of the pancratic magnification system A shown in Table 1, that is, a zoom factor of 4 is realized.

Furthermore, the first optical component L1 of the pancratic magnification system A is likewise mounted so as to be movable within a specific interval along the optical axis 20 and thereby additionally makes possible an internal focussing in a defined intercept distance range of approximately ±20 mm with the aid of the zoom system of the invention. This is a further advantage of the zoom system of the invention especially when main objectives having a fixed focal length are used.

An afocal inverting system B is mounted downstream of the pancratic magnification system A at the viewing/documentation end within the zoom system of the invention shown in FIG. 1a. In the embodiment shown, the afocal inverting system B includes three optical components (L5, L6, L7). A field lens L6 is mounted between the two boundary components (L5, L7) performing a collecting optical function. The collecting optical component L5 is configured as a two-piece composite lens and the collecting optical component L7 is configured as a two-piece composite lens plus an individual lens. A field diaphragm 4 is mounted adjacent the field lens L6 at the side thereof facing toward the object.

A double diaphragm 21, which has two diaphragm apertures for the stereo beam paths, is mounted downstream of the afocal inverting system B at the viewing/documentation end. The two diaphragm apertures each have a diameter of 4.5 mm and are mounted at a distance of 10.5 mm from each other; that is, a stereo basis of 10.5 mm is provided in the embodiment shown. The two diaphragm apertures thereby define the stereoscopic pupillary plane in which the exit pupils of the zoom system and the apparatus pupils (that is, the entry pupils of the downstream viewing/documentation unit) are coincident.

The afocal inverting system B of the zoom system of the invention is optically so dimensioned that the stereoscopic pupillary plane (that is, the apparatus pupils of the corresponding viewing/documentation unit) is imaged approximately at the center of the pancratic magnification system A. A compact intertwined beam guidance in the pancratic magnification system A is obtained with this kind of imaging of the stereoscopic pupillary plane (apparatus pupils) via the afocal inverting system B, that is, an incoupling of the stereoscopic component beam paths is achieved. The stereoscopic component beam paths are spatially separated in the plane of the apparatus pupils, more specifically, in the stereoscopic pupillary plane. The required clear diameters of the optical components (L1, L2, L3, L4) of the pancratic magnification system A do not have to be selected to be especially large as a consequence hereof. Accordingly, the complexity of optical correction for the optical elements (L1, L2, L3, L4) of the pancratic magnification system A is correspondingly reduced.

A further improvement for the optical correction results from the optimal pupil position approximately in the center of the pancratic magnification system.

In addition to the defined position of the imaged pupillary plane, the magnitude or the diameter of the apparatus pupils is determined by the selection of the imaging scale of the afocal inverting system. The resulting stereo basis, that is, the distance between pupils, is also determined by the selection of this imaging scale.

The optical data of one embodiment of the zoom system of the invention are presented in Table 1.

In Table 1, $r_i$ identifies the respective radii of curvature of the individual lenses and $d_i$ identifies the respective distances between pairs of mutually adjacent individual optically effective surfaces. The clear diameter is identified with $d_F$.

The identifying designations used in Table 1 correspond to the designations shown in FIG. 1. The continuous numbering of the radii and distances starts from the first optical component L1 of the pancratic magnification system A.

For the distances $d_5$, $d_8$ and $d_{11}$, the range of these distances between each two mutually adjacent optically effective surfaces is given. These distances can be changed in a defined manner in dependence upon one another to obtain the desired variation in magnification of the pancratic magnification system A.

In contrast, the variation by itself of the position of the first optical component L1 for a defined position of the two components L2 and L3 in the pancratic magnification system A operates to provide the above-mentioned variation of intercept distance, that is, to provide the desired internal focussing in a specific interval or range.

In Table 1, the particular glass types for the individual senses of the embodiment are also presented. The glass types given are available from Schott Glaswerke of Mainz, Germany, under the product designations listed.

The embodiment of the zoom system of the invention presented in Table 1 is only one possible embodiment. An alternate configuration is possible by appropriately varying the optical data.

The zoom system of the invention is furthermore afocal, that is, main objectives of various focal lengths can be used in combination therewith. These main objectives include those of variable intercept distance and focal length. The main objective utilized in the embodiment of FIGS. 1a and 1b as well as in combination with the optical data of Table 1 has a focal length of approximately 200 mm, Furthermore, with the invention, it is possible to also use alternative pancratic magnification systems having three or even five and more optical elements in combination with an afocal inverting system. In each case, it must be ensured that the stereoscopic pupillary plane (that is, the apparatus pupils of the downstream viewing/documentation device) is imaged in the pancratic magnification system and preferably in the center thereof.

Possible variations of a stereomicroscope, in which the zoom system of the invention is used, are described in the following with reference being made to FIGS. 2 and 3.

In the schematic representation of FIG. 2, the arrangement of a zoom system of the invention shown in FIG. 1 is shown in a first embodiment of a stereomicroscope 10. The stereomicroscope 10 has a conventional binocular tube 11 (shown schematically) at the viewing end equipped with corresponding oculars (12a, 12b) for viewing. U.S. Pat. No. 4,175,826 discloses a detailed configuration of a suitable binocular tube 11 and is incorporated herein by reference.

The main objective L0 utilized in combination with the zoom system of the invention has a fixed focal length. The remaining identifying designations of the optical components of the zoom system of the invention correspond to those identifying designations of the embodiment already described and shown in FIGS. 1a and 1b.

An image inversion is to be made in an embodiment of this kind if an inverted and stereoscopically correct viewing of the image through the tube is desired. For this purpose, a direct-vision prism in accordance with Schmidt/Pechan is suitable which is then preferably mounted in the air spaces of the zoom system of the invention.

Figure 3:
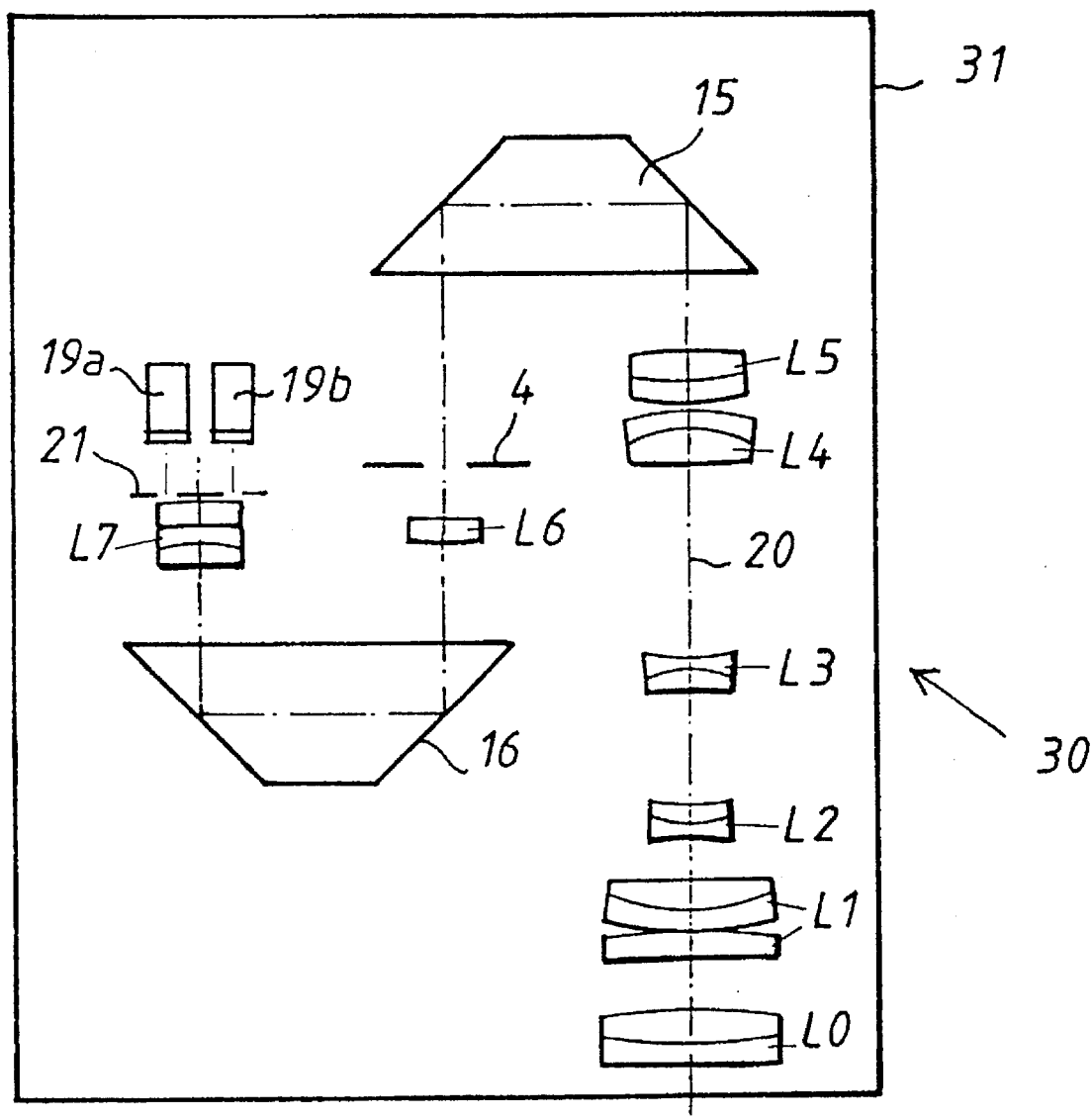

The embodiment of a stereomicroscope 30 shown in FIG. 3 is equipped with the zoom system of the invention. This embodiment includes a beam path which is folded in part within the zoom system. Furthermore, the zoom system of the invention is mounted together with the two electrooptical detector units (19a, 19b) in the housing 31 of the stereomicroscope 30.

This embodiment also corresponds to that of FIGS. 1a and 1b with respect to the optical data of the zoom system of the invention; that is, the reference characters for the individual optical elements are identical to those of FIGS. 1a, 1b and 2.

Only the beam path of the afocal inverting system B within the zoom system of the invention is arranged in a folded configuration in this embodiment. For this purpose, a total of four deflecting surfaces is provided in suitable prisms (15, 16) in the housing 31 of the stereomicroscope 30. Alternatively, the use of corresponding deflecting mirrors and the like is possible.

The pancratic imaging system B, that is, its optical components (L1, L2, L3, L4) are, on the other hand, linearly arranged as previously.

An embodiment of the zoom system of the invention of this kind within a stereomicroscope permits a compact configuration; while at the same time, a simple displacement of the optical elements (L1, L2, L3, L4) of the linearly arranged pancratic magnification system A remains assured.

Means for adapting the stereo basis when varying magnification can be provided within a stereomicroscope of this kind. Such means can be mounted downstream relative to the zoom system of the invention at the viewing/documentation end. Here, the use of mirrors having variable spacings is possible. These spacings can be varied in a defined manner in dependence upon the particular pancratic magnification and thereby guarantee a constant stereo basis even when varying magnification.

It is understood that the foregoing description is that of the preferred embodiments of the invention and that various changes and modifications may be made thereto without departing from the spirit and scope of the invention as defined in the appended claims.

TABLE 1

| Radius $r_i$/mm | Thickness or Distance $d_i$/mm | Clear Diameter $d_{i/mm}$ | Medium |
|---|---|---|---|
| $r_1 = 794.330$ | | 33.200 | |
| | $d_1 = 5.000$ | | PSK53A |
| $r_2 = 214.410$ | | 33.100 | |
| | $d_2 = 0.200$ | | Air |
| $r_3 = -69.283$ | | 32.700 | |
| | $d_3 = 4.000$ | | SF56A |
| $r_4 = -42.781$ | | 31.300 | |
| | $d_4 = 5.000$ | | PSK53A |
| $r_5 = $ planar | | 30.900 | |
| | $d_5 = (7.995$ to $49.142)$ | | Air |
| $r_6 = 55.431$ | | 15.800 | |
| | $d_6 = 2.500$ | | BAF4 |
| $r_7 = -17.529$ | | 15.700 | |
| | $d_7 = 3.500$ | | SFL6 |
| $r_8 = -34.724$ | | 15.400 | |
| | $d_8 = (21.195$ to $12.723)$ | | Air |
| $r_9 = 66.834$ | | 16.800 | |
| | $d_9 = 3.500$ | | SFL56 |
| $r_{10} = 27.781$ | | 17.300 | |
| | $d_{10} = 2.500$ | | BAF52 |
| $r_{11} = -97.163$ | | 17.900 | |
| | $d_{11} = (35.110$ to $2.435)$ | | Air |
| $r_{12} = -225.490$ | | 23.200 | |
| | $d_{12} = 6.000$ | | PK50 |
| $r_{13} = 26.993$ | | 23.900 | |
| | $d_{13} = 3.500$ | | SF2 |
| $r_{14} = 48.697$ | | 25.100 | |
| | $d_{14} = 1.000$ | | Air |
| $r_{15} = -76.626$ | | 22.000 | |
| | $d_{15} = 3.000$ | | SF1 |
| $r_{16} = -33.982$ | | 22.000 | |
| | $d_{16} = 6.000$ | | LLF6 |
| $r_{17} = 85.976$ | | 22.000 | |
| | $d_{17} = 106.980$ | | Air |
| $r_{18} = $ planar | | 13.500 | |
| | $d_{18} = 4.000$ | | SK5 |
| $r_{19} = 44.991$ | | 13.500 | |
| | $d_{19} = 97.340$ | | Air |
| $r_{20} = 217.520$ | | 15.500 | |
| | $d_{20} = 4.000$ | | BAK4 |
| $r_{21} = 26.227$ | | 15.500 | |
| | $d_{21} = 3.000$ | | SF5 |
| $r_{22} = 73.388$ | | 15.700 | |
| | $d_{22} = 0.200$ | | Air |
| $r_{23} = -262.270$ | | 15.700 | |
| | $d_{23} = 4.000$ | | F5 |
| $r_{24} = 185.670$ | | 15.700 | |
| | $d_{24} = 1.000$ | | Air |

What is claimed is:

1. A zoom system within a stereoscopic assembly defining a pregiven stereoscopic pupillary plane, the zoom system being for at least two stereoscopic beam paths of a viewing and/or documentation apparatus arranged downstream of the zoom system viewed in a direction starting from an object plane, the apparatus defining apparatus pupils lying in said stereoscopic pupillary plane, and said zoom system comprising:

a multi-element pancratic magnification system defining an optical axis; and, an afocal inverting system arranged on said axis between said viewing and/or documentation apparatus and said pancratic magnification system for imaging said stereoscopic pupillary plane into said pancratic magnification system.

2. The zoom system of claim 1, said afocal inverting system comprising three optical components.

3. The zoom system of claim 2, said three optical components being first, second and third optical components arranged on said axis in a row one next to the other with said second optical component being interposed between said first and third optical components; said first and third optical components providing a converging optical effect; said second optical component being a field lens; and, said afocal inverting system further including a field diaphragm also interposed between said first and third optical components.

4. The zoom system of claim 3, wherein said afocal inverting system is adapted to image said stereoscopic pupillary plane into approximately the center of said pancratic magnification system.

5. The zoom system of claim 2, further comprising a deflecting system arranged on said axis within said afocal inverting system.

6. The zoom system of claim 1, said pancratic magnification system comprising at least three optical elements arranged on said optical axis.

7. The zoom system of claim 6, said optical axis being linear within said pancratic magnification system.

8. The zoom system of claim 1, said pancratic magnification system comprising first, second, third and fourth optical elements; said second and third optical elements being disposed on said axis between said first and fourth optical elements; said first and fourth optical elements each providing a converging optical effect; and, said second and third optical elements providing a negative optical effect and being mounted on said axis so as to be displaceable therealong to provide a defined magnification in response to a defined displacement thereof along said axis.

9. The zoom system of claim 8, wherein said first optical element is arranged in said pancratic magnification system so as to face toward said object plane; and, said first optical element also being displaceable along said axis to provide an inner focussing within a specific range of intercept distances in response to a defined displacement of said first optical element.

10. A stereoscopic microscope having a main objective and defining two viewing beam paths passing through said objective and further defining a pupillary plane and being adapted to accommodate a viewing and/or documentation apparatus downstream of said pupillary plane viewed in a direction starting from said main objective, the stereoscopic microscope comprising:

a zoom system arranged between said pupillary plane and said main objective; and, said zoom system including: a multi-element pancratic magnification system defining an optical axis; and, an afocal inverting system arranged on said axis between said viewing and/or documentation apparatus and said pancratic magnification system for imaging said stereoscopic pupillary plane into said pancratic magnification system.

11. The stereomicroscope of claim 10, wherein said viewing and/or documentation apparatus comprises a stereoscopic binocular tube.

12. The stereomicroscope of claim 11, wherein said viewing and/or documentation apparatus comprises at least one electrooptical detector unit.

13. The stereomicroscope of claim 12, wherein said pancratic magnification system has a linear configuration; said afocal inverting system defines a folded optical beam path along said axis; and, wherein said zoom system further comprises a deflecting system arranged on said axis within said afocal inverting system.

* * * * *

UNITED STATES PATENT AND TRADEMARK OFFICE
CERTIFICATE OF CORRECTION

PATENT NO.  : 5,612,817
DATED       : March 18, 1997
INVENTOR(S) : Fritz Strähle It is certified that error appears in the above-indentified patent and that said Letters Patent is hereby corrected as shown below:

In column 1, line 58: delete "pancranic" and substitute -- pancratic -- therefor.

In column 4, line 2: delete "various" and substitute -- vario -- therefor.

In column 4, line 44: after "components", delete "(LS, " and substitute -- (L5, -- therefor.

In column 5, line 51: delete "senses" and substitute -- lenses -- therefor.

In column 5, line 65: delete "200 mm," and substitute -- 200 mm. -- therefor.

In column 8, line 13: delete "pupilliary" and insert -- pupillary -- therefor.

Signed and Sealed this

Tenth Day of June, 1997

*Attest:*

BRUCE LEHMAN

*Attesting Officer*    *Commissioner of Patents and Trademarks*